United States Patent [19]
Aoshima et al.

[11] Patent Number: 4,908,812
[45] Date of Patent: Mar. 13, 1990

[54] SYNCHRONIZING SIGNAL REPRODUCING CIRCUIT IN A DISC PLAYBACK DEVICE

[75] Inventors: Shinzi Aoshima; Sadayuki Narusawa, both of Hamamatsu, Japan

[73] Assignee: Yamaha Corporation, Hamamatsu, Japan

[21] Appl. No.: 905,864

[22] Filed: Sep. 10, 1986

[30] Foreign Application Priority Data

Sep. 13, 1985 [JP] Japan .................................. 60-202829
Sep. 19, 1985 [JP] Japan .................................. 60-207355

[51] Int. Cl.⁴ ........................... H04N 5/76; G11B 5/09
[52] U.S. Cl. ........................................ 369/59; 360/51
[58] Field of Search ................... 360/51, 73, 33.1, 27; 369/48, 49, 50, 59; 358/342, 335

[56] References Cited

U.S. PATENT DOCUMENTS

| | | | |
|---|---|---|---|
| 3,755,798 | 8/1973 | Aguirre | 360/51 |
| 4,141,046 | 2/1979 | Brown | 360/51 |
| 4,394,695 | 7/1983 | Mahon | 360/51 |
| 4,641,326 | 2/1987 | Tomisawa | 360/51 |

FOREIGN PATENT DOCUMENTS

| | | | |
|---|---|---|---|
| 56-89178 | 7/1981 | Japan | 360/33.1 |
| 2821390 | 11/1978 | Netherlands | 358/342 |

*Primary Examiner*—Vincent P. Canney
*Attorney, Agent, or Firm*—Spensley Horn Jubas & Lubitz

[57] ABSTRACT

A synchronizing signal reproducing circuit in a disc playback device for playing back discs such as a video disc and Compact Disc comprises an assumed synchronizing signal detection circuit for taking out an assumed synchronizing signal having possibility of being a true synchronizing signal from a signal reproduced from a disc, a window establishing circuit for establishing a window which, on the basis of a preceding true synchronizing signal, includes a timing at which a true synchronizing signal is expected to occur, and a synchronizing signal picking up circuit for picking up the assumed synchronizing signal as a true synchronizing signal if it occurs in the window. The window is so established that a future side range becomes wider than a past side range with respect to the timing at which the true synchronizing signal is expected to occur. The window establishing circuit may comprise a counter counting the number of times the synchronizing signal has not consecutively been detected in the window and operate in such a manner that, when count of the counter has reached a predetermined value, the window is enlarged to pick up the synchronizing signal in the enlarged window and, when the synchronizing signal has not been found even in this enlarged window, the window is removed for further detection of the synchronizing signal.

13 Claims, 7 Drawing Sheets

SYNCHRONIZING SIGNAL REPRODUCING CIRCUIT IN A DISC PLAYBACK DEVICE

BACKGROUND OF THE INVENTION

This invention relates to a synchronizing signal reproducing circuit in a disc playback device for taking out a synchronizing signal from a signal reproduced from a disc, such synchronizing signal being used for a reference signal in various controls such as a disc motor control in disc playback devices for playing back discs such as an optical type video disc and a Compact Disc in the Compact Disc Digital Audio System.

In a disc playback device for a video disc or a Compact Disc, a synchronizing signal (i.e., horizontal synchronizing signal) is taken out of a reproduced signal from the disc and is used, for example, for rotation control of a disc motor by PLL by comparing this synchronizing signal in phase with a reference clock signal. For taking a synchronizing signal out of a reproduced signal from a video disc, for example, a composite video signal is reproduced from the video disc, a synchronizing signal component is separated from this composite signal by comparing it at a predetermined threshold value and an assumed synchronizing signal is obtained by edge-detecting this component. Since there is a possibility that this assumed synchronizing signal contains an equalizing pulse and noise, a so-called "window" is established, which is a predetermined range on the time axis in which the synchronizing signal is expected to occur, and a signal which has occurred in this window only is taken out as a true synchronizing signal. If there is no signal occurring in this window, a substitution signal is provided to serve as a synchronizing signal.

Figure 3A:
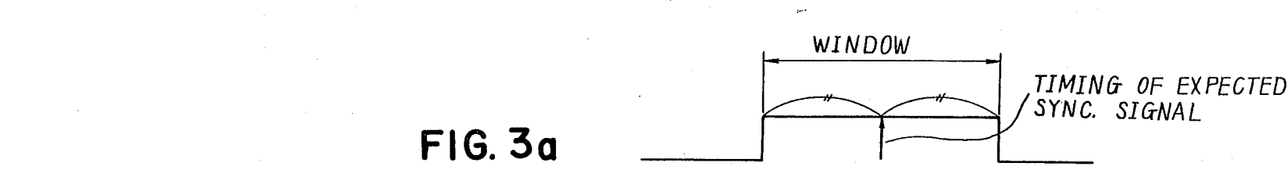
FIGS. 3a through 3c are diagrams showing the operation of a window established according to the prior art devices.

In prior art devices, the window is established in such a manner that, as shown in FIG. 3a, a future side range and a past side range of the window with respect to the timing at which a synchronizing signal is expected to occur are of the same time length, i.e., the expected synchronizing signal occurs at a central point in the window.

Figures 3B, 3C:
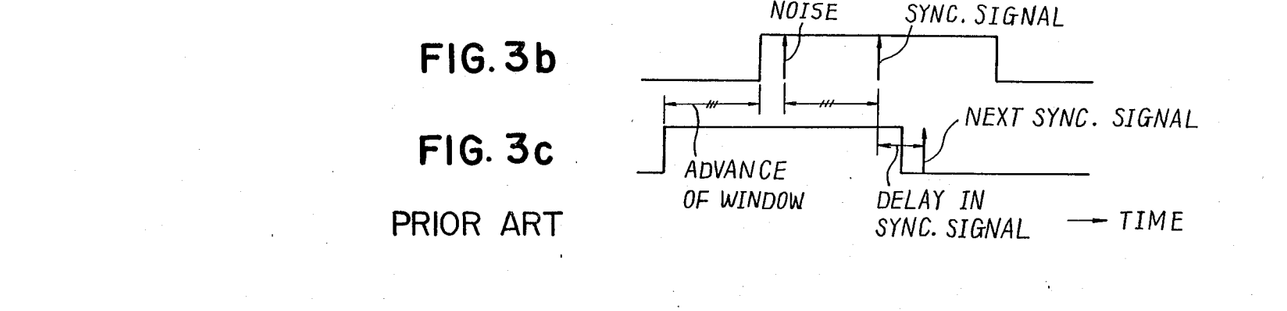

In the system using this window, a first signal occurring in the window is deemed to be effective and a next window is established on the basis of this first signal. Accordingly, when a noise or an equalizing pulse occurs before a true synchronizing signal in the window as shown in FIG. 3b, a next window is established on the basis of this noise or equalizing pulse so that the position of the window is shifted to the past side as shown in FIG. 3c. Besides, it is judged in this case that the disc motor is rotating at a greater speed than a predetermined one because the signal has been obtained at an earlier timing than a timing at which the synchronizing signal is expected to occur so that a control is performed to reduce the speed with a result that occurrence of a next synchronizing signal is further delayed. Thus, the window and the synchronizing signal are shifted in directions in which they are spaced away from each other with a resulting tendency that a next synchronizing signal does not occur in the window. If this state is brought about, the synchronizing signal can no longer be detected. If the window range is unduly enlarged for preventing occurrence of this state, it will result in the disadvantage that it becomes easier to pick up noises in this enlarged window.

It is, therefore, a first object of the invention to provide a synchronizing signal reproducing circuit in a disc playback device which, when a noise has occurred before a true synchronizing signal in the window, is capable of including a subsequent synchronizing signal within the window without unduly enlarging the window range.

In the system using this window, there sometimes occurs a state in which absence of the synchronizing signal continues for many consecutive periods. If this state occurs, it is often more proper to judge that the reproduced signal is not in synchronization (i.e., in the state of "lockout") than to consider that some synchronizing signals are missing due to dropout or the like.

For coping with this problem, prior art devices remove the window immediately upon occurrence of such a state, treat a signal which occurs first after the removal of the window as a synchronizing signal unconditionally and establish the window anew on the basis of this signal thereby to bring the reproduced signal into a synchronized state again.

The prior art devices however have the disadvantage that, if the window is removed immediately upon making the judgement that the lockout state exists, there arises the possibility that the device treats a false signal such as an equalizing pulse or noise as a synchronizing signal with a resulting erroneous operation of the device.

It is, therefore, a second object of the invention to provide a synchronizing signal reproducing circuit in a disc playback device which, when a lockout state exists, is capable of bringing the reproduced signal into a synchronized state again without causing an erroneous operation due to an equalizing pulse or a noise.

SUMMARY OF THE INVENTION

For achieving the first object, the synchronizing signal reproducing circuit according to the invention is characterized in that it comprises an assumed synchronizing signal detection circuit for taking out an assumed synchronizing signal having possibility of being a true synchronizing signal from a signal reproduced from a disc, a window establishing circuit for establishing a window in such a manner that, on the basis of a preceding true synchronizing signal, said window includes a timing at which a true synchronizing signal is expected to occur, and a synchronizing signal picking up circuit for picking up the assumed synchronizing signal having been detected by said assumed synchronizing signal detection circuit as a true synchronizing signal if the assumed synchronizing signal occurs in said window, said window being so established that a future side range is wider than a past side range with respect to said timing at which the true synchronizing signal is expected to occur.

According to the invention, when a noise signal has occurred before a true synchronizing signal in the window and a synchronizing signal occurring at a next timing has been shifted behind with respect to the window, the window whose future side has a wider range can include the shifted synchronizing signal and therefore can pick up the synchronizing signal. When a noise signal has occurred after a true synchronizing signal, the true synchronizing signal which has occurred first is effective and the subsequently occurring noise signal is disregarded. Accordingly, a next synchronizing signal is never shifted towards the past side of the window. It is not necessary to widen the past side of the window so that a noise signal can be effectively removed without an undue enlargement of the window range.

For achieving the second object of the invention, the synchronizing signal reproducing circuit according to the invention is characterized in that it comprises an assumed synchronizing signal detection circuit for taking out an assumed synchronizing signal having possibility of being a true synchronizing signal from a signal reproduced from a disc, a window establishing circuit for establishing, on the basis of preceding synchronizing signal, a window covering a range within which a synchronizing signal taken out of a signal reproduced from a disc is expected to occur, and a synchronizing signal picking up circuit for picking up the assumed synchronizing signal detection circuit as a true synchronizing signal if the assumed synchronizing signal occurs in said window, said window establishing circuit comprising a counter circuit counting the number of times said synchronizing signal has not consecutively been detected in said window and operating in such a manner that said window is enlarged when the count of said counter circuit has reached a predetermined value and thereafter picking up of the synchronizing signal is carried out in the enlarged window and, when the synchronizing signal has not been found even in this enlarged window, said window is removed.

According to the invention, when a synchronizing signal has not consecutively been detected in the window, the window range is slightly enlarged to detect the synchronizing signal in the enlarged window range instead of immediately removing the window and the window is removed for detection of the synchronizing signal only when the synchronizing signal has not been found even in the enlarged window. This increases the possibility that the synchronized state is restored without picking up an equalizing pulse or a noise whereby occurrence of an erroneous operation is held to the minimum.

Preferred embodiments of the invention will now be described with reference to the accompanying drawings.

BRIEF DESCRIPTION OF THE DRAWINGS

In the accompanying drawings,

FIGS. 8 and 9 are time charts showing lockout states of the circuit of FIG. 6 in which FIG. 8 shows a state in which a horizontal synchronizing signal HSYO has been detected within the enlarged window range and FIG. 9 shows a state in which the horizontal synchronizing signal HSYO has not been detected within the enlarged window range.

DESCRIPTION OF PREFERRED EMBODIMENT

Figure 1:
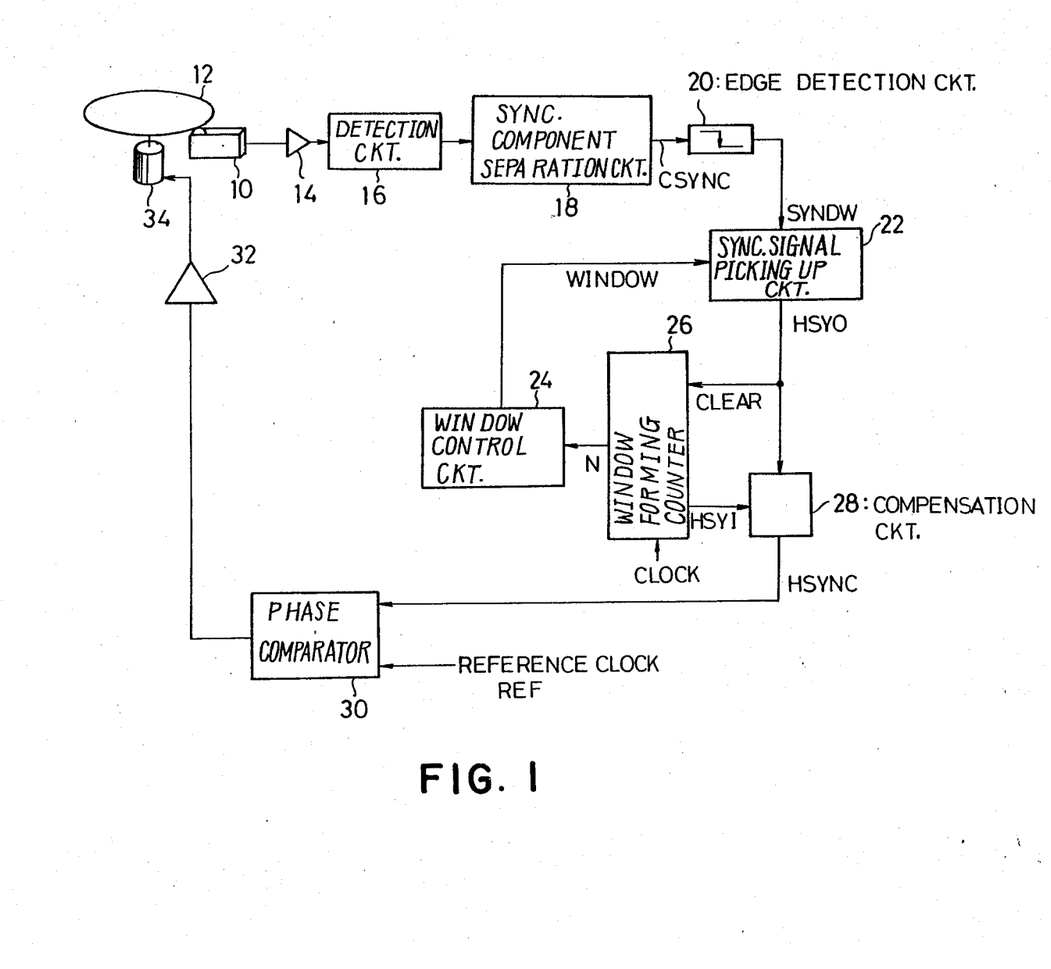
FIG. 1 is a block diagram showing an embodiment of the invention.

FIG. 1 shows an embodiment of the invention. Description will be made about a case in which the invention is applied to a playback device for a video disc.

Figure 2:
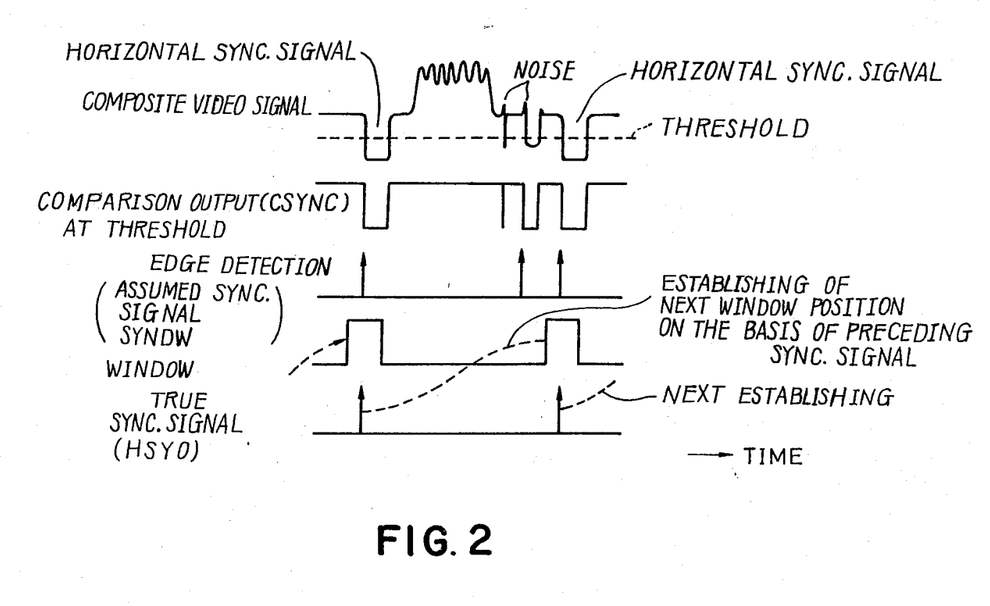
FIG. 2 is a diagram showing a process of detection of a synchronizing signal in the embodiment of FIG. 1.

In FIG. 1, a video disc 12 is rotated by a disc motor 34. Data recorded on the disc 12 is picked up by a pickup head 10 and the reproduced signal is detected by a detection circuit 16 through an HF amplifier 14 and is provided by the detection circuit 16 as a composite video signal. The process of detecting a synchronizing signal will be described with reference to FIG. 2. The composite video signal is applied to a synchronizing component separation circuit 18 in which a synchronizing component signal CSYNC is separated by cutting a video component side of the composite video signal at a predetermined threshold level. An edge detection circuit 20 detects a fall portion of the synchronizing component signal CSYNC excluding a fall portion which is apparently deemed to be one of noise and thereupon produces an assumed synchronizing signal (i.e., a signal which is expected to be a true synchronizing signal) SYNDW. The removal of noise in this stage is performed by detecting only a fall portion with a succeeding lower state which has a sufficient pulse width as required for the synchronizing signal and which has a preceding upper pulse portion which maintains a risen state for a predetermined period of time. This assumed synchronizing signal SYNDW, however, contains, as will be apparent from requirements for such type of disc, not only a horizontal synchronizing signal but also an equalizing pulse which is inserted intermediate horizontal synchronizing signals for discriminating vertical synchronizing signals. Besides, this signal SYNDW may contain an unexpected noise component.

A synchronizing signal picking up circuit 22 provides the assumed synchronizing signal SYNDW which occurs in a window established by a window control circuit 24 as a horizontal synchronizing signal (true synchronizing signal) HSYO. If a plurality of signals are obtained in the window due to occurrence of noise or the like, the first signal is selected as effective and the rest is disregarded.

A window forming counter 26 counts up a clock prepared by frequency-dividing a crystal oscillator output and is cleared each time the horizontal synchronizing signal HSYO is produced. The window control circuit 24 receives a count N of the window forming counter 26 and produces a signal designating a window position on the basis of the timing of a next horizontal synchronizing signal HSYO which is expected to occur in accordance with the count N. This timing arrives at a multiple of the count N corresponding to the predetermined period of the horizontal synchronization.

Figure 4:
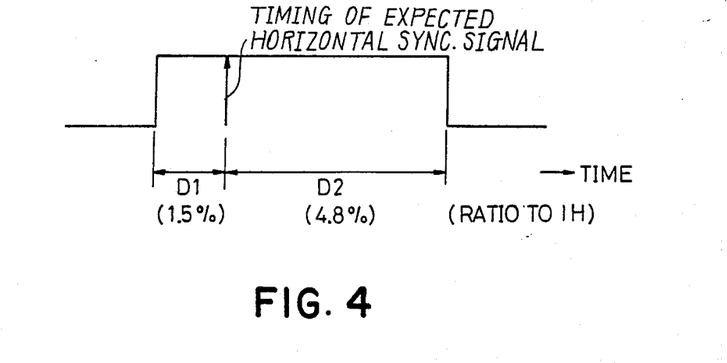
FIG. 4 is a diagram showing an example of establishing a window according to the invention.

An example of the window designated by the window control circuit 24 is shown in FIG. 4. In this window, width D2 after (i.e., future side) the timing of an expected next horizontal synchronizing signal HSYO is made larger than width D1 before (i.e., past side) the timing. In this example, widths D1 and D2 are set at 1.5% and 4.8% respectively with 1H (one horizontal scanning period, i.e., one period of the horizontal synchronizing signal) being taken as 100%.

A compensation circuit 28 produces, when the assumed synchronizing signal SYNDW is not obtained in the window due to dropout or the like and so the horizontal synchronizing signal HSYO is not produced, a substitution signal HSYI in response to the count of the window forming counter 26 at each multiple of a count corresponding to the required period of the horizontal synchronizing signal. As a result, a signal HSYNC which is a combined signal of the horizontal synchronizing signal HSYO produced when the assumed synchronizing signal SYNDW occurs in the window and the substitution signal HSYI produced in the absence of the signal HSYO is provided as the horizontal synchronizing signal. This horizontal synchronizing signal HSYNC is used as a reference signal in controls in various parts of the disc playback device such as a disc motor control.

In FIG. 1, the horizontal synchronizing signal HSYNC is compared in a phase comparator 30 with a reference clock REF in frequency and phase and a signal corresponding to the difference is applied to a disc motor 34 through a drive amplifier 32 for the rotation control by the PLL control.

Operation of the circuit shown in FIG. 1 during occurrence of noise will be described with reference to FIG. 5.

Figure 5A:
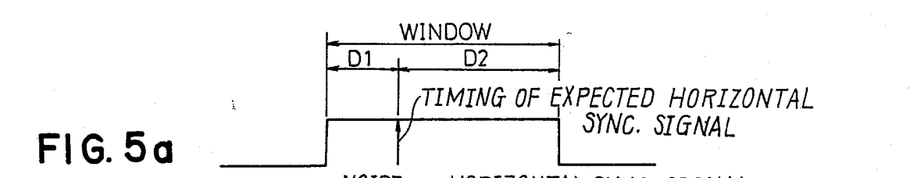
FIGS. 5a through 5c are diagrams showing an example of the operation of a window established according to the invention.

As shown in FIG. 5a, the width of the window is so determined that a range D1 before an expected timing of next horizontal synchronizing signal HSYO is smaller than a range D2 after the expected timing.

Figure 5B:
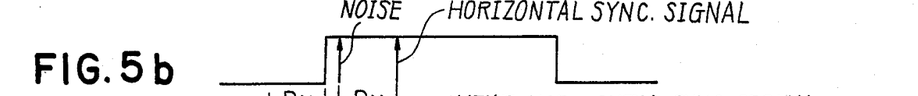
Figure 5C:
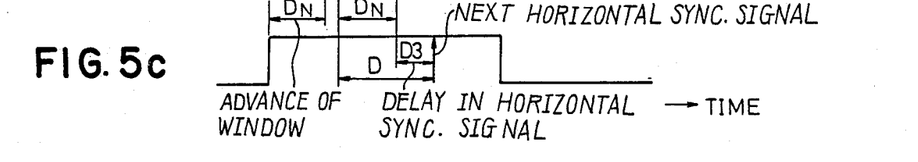

If, as shown in FIG. 5b, the assumed synchronizing signal SYNDW due to noise appears in the window before a proper horizontal synchronizing signal HSYO, the timing of a next window is determined on the basis of this preceding signal and a rotation servo operates to reduce the rotation speed. Accordingly, the timing of the next assumed synchronizing signal SYNDW corresponding to the next horizontal synchronizing signal HSYO is shifted rearwardly with respect to the window as shown in FIG. 5c. More specifically, the next window is shifted forwardly by time length DN which is time length by which the noise appeared earlier than the proper horizontal synchronizing signal HSYO in the preceding window and, moreover, due to the rotation servo, the next horizontal synchronizing signal HSYO is shifted behind by time length D3 from the timing at which it should originally appear. Accordingly, this horizontal synchronizing signal HSYO is shifted relative to the window by D=DN+D3. Since, however, an ample width is taken as the rear width D2 in the window, the horizontal synchronizing signal HSYO is still within the window range. If the width D is smaller than the width D2, the horizontal synchronizing signal HSYO can remain within the window range.

If noise has occurred after occurrence of the horizontal synchronizing signal HSYO, the operation starts with this horizontal synchronizing signal HSYO and noise is disregarded, for the first signal only is effective. Therefore, there is no likelihood of an erroneous operation due to the noise. For this reason, it is not necessary to widen the front side (i.e., past side) window width D1.

Figure 6:
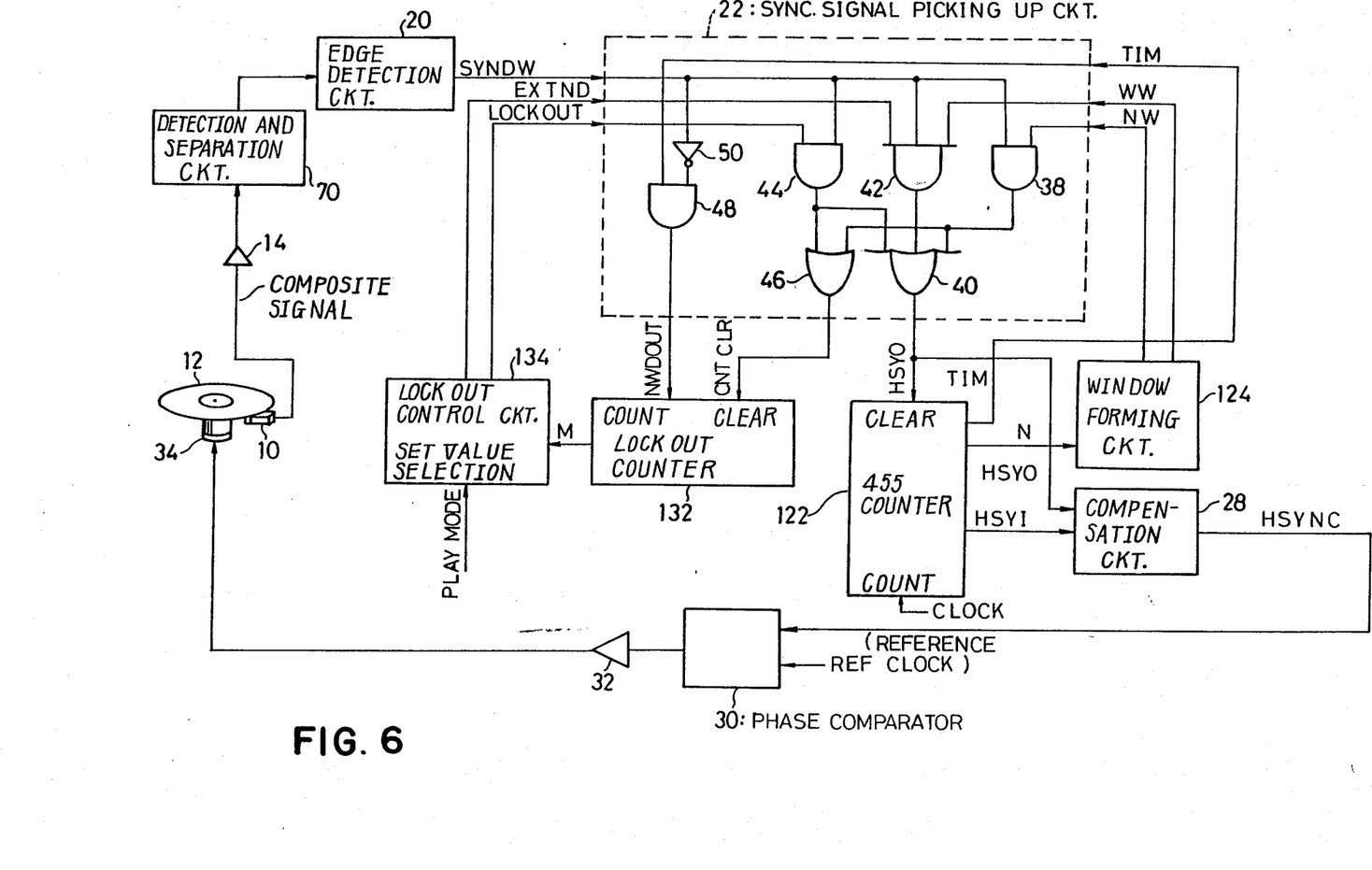
FIG. 6 is a block diagram showing another embodiment of the invention.

Another embodiment of the invention which achieves the above described second object of the invention is shown in FIG. 6. This embodiment is one in which the invention is applied to a video disc playback device. In FIG. 6, the same component parts and signals as those in FIG. 1 are designated by the same reference characters and detailed description thereof is omitted. In FIG. 6, data recorded on a disc 12 is detected by a pickup head 10 and the detected signal (composite video signal) is applied to a detection and separation circuit 70 through an HF amplifier 14 for detection of a synchronizing signal component. The detected synchronizing signal component is applied to an edge detection circuit 20 for removal of an apparent noise component. The circuit 20 detects a falling edge which is assumed to be one of a genuine synchronizing signal as an assumed synchronizing signal SYNDW.

A 455 counter 122 is a counter which counts a clock from a crystal oscillator and is cleared each time a horizontal synchronizing signal HSYO (a signal produced at a timing of the assumed synchronizing signal SYNDW when this signal SYNDW has occurred in a window for a horizontal synchronizing signal). The counter counts 455 counts during 1H (one horizontal scanning period). The count N of the 455 counter 122 is applied to a window forming circuit 124. The 455 counter 122 produces also a signal TIM at a last timing of a narrow window to be described later. While the horizontal synchronizing signal HSYO is being provided, the 455 counter 122 is cleared by this signal HSYO before the count reaches the last timing of the window and, accordingly, the signal TIM is not produced. The 455 counter 122 further produces a substitution signal HSYI to be described later every 455 counts.

A window forming circuit 124 produces a signal NW for setting a narrow window range and a signal WW for setting a wide range in accordance with the count of the 455 counter 122. The narrow window and the wide window are established on the basis of the 455-th count of the 455 counter 122. These windows are established within ranges before and after a timing at which the horizontal synchronizing signal is expected to occur and the equalizing pulse and noise are removed by being excluded from these window ranges.

A compensation circuit 28 produces, when the horizontal synchronizing signal HSYO has not occurred in the window, the substitution signal HSYI thereby ensuring production of the horizontal synchronizing signal HSYNC for each 1H. This horizontal synchronizing signal HSYNC is utilized for reference signal in controls in various parts of the playback device such as the disc motor control.

A phase comparator 30 compares the horizontal synchronizing signal HSYNC with a reference clock REF prepared from a crystal oscillation clock in phase and produces a signal corresponding to phase difference between the two signals. This signal is applied to the disc motor 34 through an amplifier 32 to perform rotation control of the disc motor 34 by the PLL control.

A lockout counter 132 counts the number of times the horizontal synchronizing signal HSYO has not been detected consecutively in the narrow window. The counter 132 counts a signal NWDOUT which is produced when the horizontal synchronizing signal HSYO has not been detected in the window and is cleared by a signal CNTCLR which is produced when the horizontal synchronizing signal HSYO has been detected.

A lockout control circuit 134 produces a signal EXTEND requiring the wide window when count M of the lockout counter 132 has reached a set value (e.g., 14) in a play mode. If the horizontal synchronizing signal SYNDW has not been detected in this wide window either and the lockout counter 132 has been further counted up to a predetermined value, e.g. 15, the lockout control circuit 134 produces a signal LOCKOUT requiring entire removal of the windows. The set value at which the signal EXTEND is produced can be suitably selected.

A synchronizing signal picking up circuit 22 produces, when the assumed synchronizing signal SYNDW has occurred in the established window, the horizontal synchronizing signal HSYO at the timing of the signal SYNDW. Simultaneously, the circuit 22 produces the signal CNTCLR which clears the lockout counter 132 except when the signal SYNDW has been detected in the wide window. When the assumed synchronizing signal SYNDW has not occurred in the narrow window, the circuit 22 produces the signal NWDOUT thereby causing the lockout counter 132 to count up.

In the synchronizing signal picking up circuit 22, an AND gate 38 receives the signal NW for setting the narrow window and the assumed synchronizing signal SYNDW and is enabled when the signal SYNDW has been detected in the narrow window, providing the horizontal synchronizing signal HSYO ="1" through an OR gate 40. In this case, this horizontal synchronizing signal HSYO is provided directly as the horizontal synchronizing signal HSYNC from the compensation circuit 28. The 455 counter 122 is cleared by this signal HSYO to resume counting from 1.

An AND gate 42 receives the signal WW for setting the wide window, the signal EXTEND also for setting the wide window and the assumed synchronizing signal SYNDW and is enabled when the signal SYNDW has been detected in the wide window being established. In this state, the AND gate 42 produces the horizontal synchronizing signal HSYO through the OR gate 40. This signal is provided from the compensation circuit 28 as the horizontal synchronizing signal HSYNC. At this time, the 455 counter 122 is cleared by the horizontal synchronizing signal HSYO.

An AND gate 44 receives the lockout signal LOCKOUT and the assumed synchronizing signal SYNDW and produces its output as the horizontal synchronizing signal HSYO through the OR gate 40. In other words, when the lockout state has been detected, the windows are removed and the horizontal synchronizing signal HSYO is produced unconditionally in response to the assumed synchronizing signal SYNDW which has occurred first after the removal of the windows, The lockout counter 132 is cleared by this first occurring assumed synchronizing signal SYNDW through an OR gate 46.

An AND gate 48 receives the signal TIM which is produced at the last timing of the narrow window and a signal derived by inverting the assumed synchronizing signal SYNDW by an inverter 50 and produces the signal NWDOUT when the horizontal synchronizing signal HSYO has not occurred in the narrow window.

Operation of the embodiment of FIG. 6 during the play mode will now be described.

Figure 7:
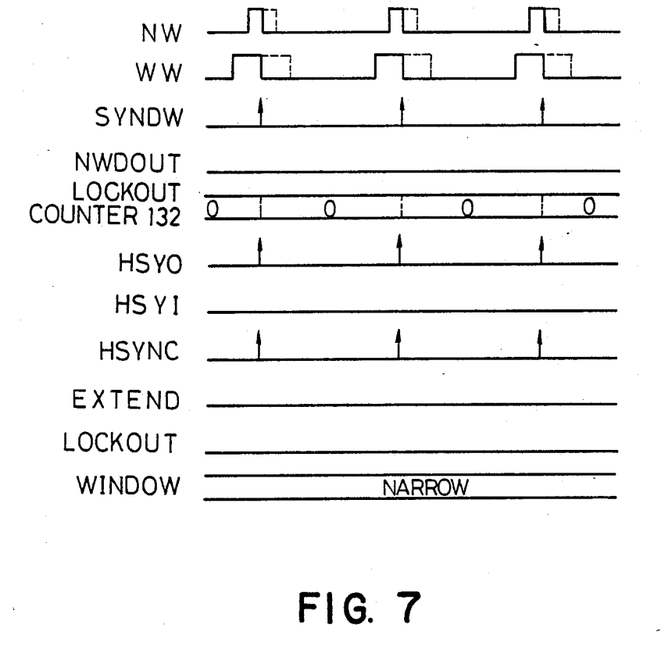
FIG. 7 is a time chart showing a state when the circuit of FIG. 6 is normally operating.

FIG. 7 shows a state in which the assumed synchronizing signal SYNDW has occurred in the narrow window in a normal manner. In the narrow window, the assumed synchronizing signal SYNDW clears the 455 counter 122 as the horizontal synchronizing signal HSYO through the AND gate 38 and the OR gate 40. The signal SYNDW clears also the lockout counter 132 through the AND gate 38 and the OR gate 46. The horizontal synchronizing signal HSYO responsive to the assumed synchronizing signal SYNDW is provided from the compensation circuit 28 as the horizontal synchronizing signal HSYNC and the rotation control of the disc motor 34 is performed utilizing this signal HSYNC.

In a case where the horizontal synchronizing signal HSYO has not been obtained temporarily due to dropout or the like in a normal operation, the signal HSYO is the substitution signal HSYI prepared by the 455 counter 122 is utilized. At this time, the lockout counter 132 is counted up but, if the assumed synchronizing signal SYNDW has occurred before the count of the lockout counter 132 has reached the set value, e.g. 14, the lockout counter 132 is cleared and the normal operation is continued.

Figure 8:
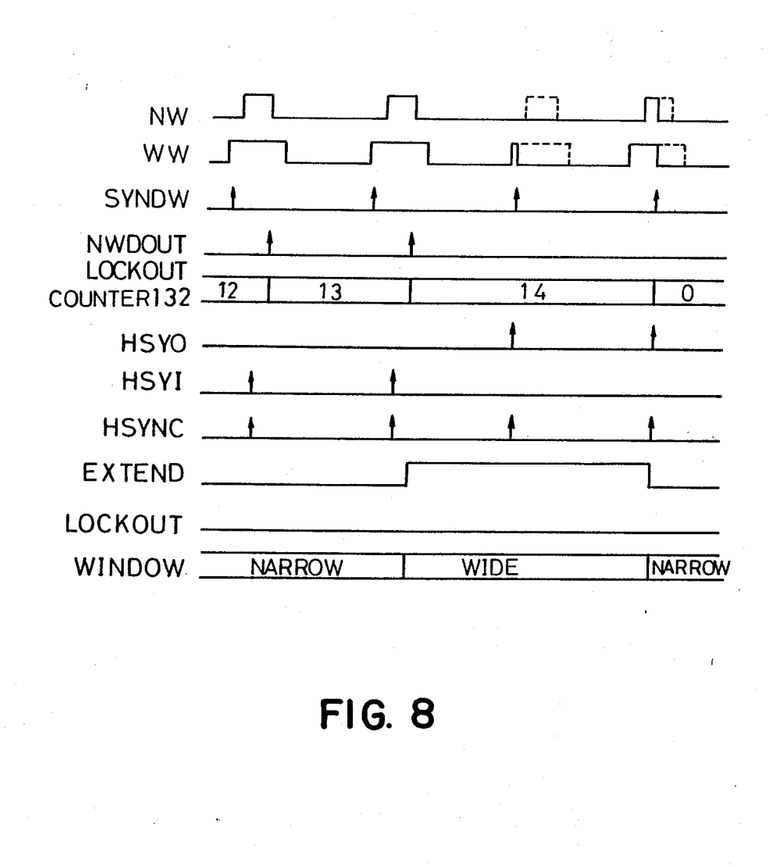

FIG. 8 shows a state in which the assumed synchronizing signal SYNDW is out of the narrow window but is within the wide window. When an unsynchronized state exists, this seldom is an extremely unsynchronized state and in most cases a slightly unsynchronized state as shown in FIG. 8. In this case, the horizontal synchronizing signal HSYO is not produced since the assumed synchronizing signal SYNDW is out of the narrow window and, accordingly, the 455 counter 122 continues counting up and produces the substitution signal HSYI every 455 counts. The compensation circuit 28 uses this signal HSYI and, responsive to the signal HSYI, produces the horizontal synchronizing signal HSYNC. The window forming circuit 124 produces the signals NW and WW for setting the window ranges every 455 counts of the 455 counter 122. Further, the 455 counter 122 produces the signal TIM at the last timing of each narrow window. This signal TIM is supplied to the lockout counter 132 through the AND gate 48 to be counted up by the counter 132.

Upon reaching of the count of the counter 132 to 14 in the above described example, the lockout control circuit 134 produces the signal EXTEND requiring the use of the wide window thereby switching the window from the narrow one to the wide one. The AND gate 42 thereby is enabled. When the assumed synchronizing signal SYNDW has occurred in the wide window set by the signal WW, the signal HSYO is produced through the AND gate 42 and the OR gate 40. The 455 counter 122 thereby is cleared. The lockout counter 132 however is not cleared yet, remaining at the count 14.

Upon clearing of the 455 counter 122 by the horizontal synchronizing signal HSYO, a next window range is determined on the basis of the timing of this signal HSYO so that the window is shifted towards the assumed synchronizing signal SYNDW and the assumed synchronizing signal SYNDW is obtained in a next narrow window. The lockout counter 132 therefore is cleared through the AND gate 38 and the OR gate 46 and the signal EXTEND becomes "0". The window thereby is switched from the wide one to the narrow one and the operation state is restored to the normal operation. If the synchronized state is restored by using the wide window is used, the equalizing pulse and most of noises are removed also by this wide window so that reliability of the synchronization is by far greater than in a case where a synchronized state is restored in a state in which the windows are entirely removed.

Figure 9:
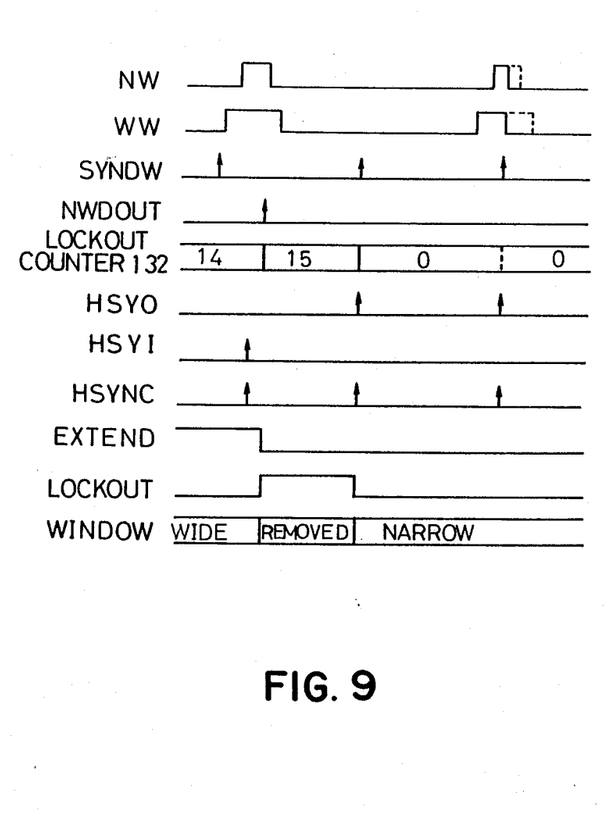

FIG. 9 shows a state in which the horizontal synchronizing signal is out of both the narrow window and the wide window. In this state, the assumed synchronizing signal SYNDW is not obtained even though the count of the lockout counter 132 has reached 14 and the window has been switched from the narrow one to the wide one. Therefore, the signal NWDOUT is further produced and the lockout counter 132 counts up to 15. The lockout control circuit 132 thereupon turns the signal EXTEND to "0" and the signal LOCKOUT to "1".

The AND gate 44 thereby is enabled and the window is removed.

Upon removal of the window, the assumed synchronizing signal SYNDW which has occurred first thereafter becomes the horizontal synchronizing signal HSYO unconditionally through the AND gate 44 and the OR gate 40 and clears the 455 counter 122. This signal also clears the lockout counter 132 through the OR gate 46. The signal LOCKOUT thereby falls to "0" and the narrow window can now be used. As the 455 counter 122 is cleared by the horizontal synchronizing signal HSYO, a next window range is determined on the basis of the timing of this signal HSYO so that the window is established within ranges before and after the assumed synchronizing signal SYNDW and the assumed synchronizing signal SYNDW is obtained in the next narrow window. The operation is restored to the normal operation. It will be appreciated that in the case where the synchronized state is restored after reaching the stage in which the windows are entirely removed, the synchronized state thus restored should be regarded as containing the equalizing pulse and noises and therefore is not different from the prior art device as far as this state is concerned.

What is claimed is:

1. A synchronizing signal reproducing circuit in a disc playback device comprising:
   an assumed synchronizing signal detection circuit for taking out an assumed synchronizing signal having the possibility of being a true synchronizing signal from a signal reproduced from a disc;
   a window establishing circuit for establishing a window, on the basis of a preceding true synchronizing signal, which includes a timing at which a true synchronizing signal is expected to occur; and
   a synchronizing signal picking up circuit for picking up the assumed synchronizing signal detection circuit as a true synchronizing signal if the assumed synchronizing signal occurs in said window;
   said window having a future side range which is wider than a past side range with respect to said timing at which the true synchronizing signal is expected to occur.

2. A synchronizing signal reproducing circuit as defined in claim 1 wherein said synchronizing signal picking up circuit picks up, as the true synchronizing signal, a first one among assumed synchronizing signals having been detected by said assumed synchronizing signal detection circuit.

3. A synchronizing signal reproducing circuit as defined in claim 2 wherein said window establishing circuit comprises a counter circuit which counts a reference clock, is cleared upon receipt of the true synchronizing signal from said synchronizing signal picking up circuit and establishes said window in accordance with a count of this counter circuit.

4. A synchronizing signal reproducing circuit as defined in claim 3 wherein said counter circuit produces a substitution signal in accordance with the count thereof when said synchronizing signal picking up circuit has failed to pick up a true synchronizing signal within said window.

5. A synchronizing signal reproducing circuit as defined in claim 4 wherein said disc is a video disc and said synchronizing signal is a horizontal synchronizing signal.

6. A synchronizing signal reproducing circuit as defined in claim 5 further comprising a phase comparator circuit for comparing the true synchronizing signal from said synchronizing signal picking up circuit and the substitution signal from said counter circuit with a reference clock in phase for utilizing these signals for a spindle motor servo control.

7. A synchronizing signal reproducing circuit in a circuit playback device comprising:
   an assumed synchronizing signal detection circuit for taking out an assumed synchronizing signal having the possibility of being a true synchronizing signal from a signal reproduced from a disc;
   a window establishing circuit for establishing, on the basis of a preceding synchronizing signal, a window covering a range within which a synchronizing signal taken out of a signal reproduced from a disc is expected to occur; and
   a synchronizing signal picking up circuit for picking up the assumed synchronizing signal having been detected by said assumed synchronizing signal detection circuit as a true synchronizing signal if the assumed synchronizing signal occurs in said window;
   said window establishing circuit comprising a counter circuit counting the number of times said synchronizing signal has not consecutively been detected in said window, said window being enlarged when the count of said counter circuit has reached a predetermined value and thereafter picking up of the synchronizing signal being carried out in the enlarged window and, said enlarged window being removed when the synchronizing signal has not been found even in this enlarged window.

8. A synchronizing signal reproducing circuit as defined in claim 7 wherein said counter circuit is cleared when the true synchronizing signal occurring in said window has been picked up and is counted up or down when the true synchronizing signal has not been found in said window.

9. A synchronizing signal reproducing circuit as defined in claim 8 wherein said synchronizing signal picking up circuit picks up, as the true synchronizing signal, a first one among assumed synchronizing signals having been detected by said assumed synchronizing signal detection circuit.

10. A synchronizing signal reproducing circuit as defined in claim 9 wherein said window establishing circuit comprises a counter circuit which counts a reference clock, is cleared upon receipt of the true synchronizing signal from said synchronizing signal picking up circuit and establishes said window in accordance with a count of this counter circuit.

11. A synchronizing signal reproducing circuit as defined in claim 10 wherein said counter circuit produces a substitution signal in accordance with the count thereof when said synchronizing signal picking up circuit has failed to pick up a true synchronizing signal within said window.

12. A synchronizing signal reproducing circuit as defined in claim 11 wherein said disc is a video disc and said synchronizing signal is a horizontal synchronizing signal.

13. A synchronizing signal reproducing circuit as defined in claim 12 further comprising a phase comparator circuit for comparing the true synchronizing signal from said synchronizing signal picking up circuit and the substitution signal from said counter circuit with a reference clock in phase for utilizing these signals for a spindle motor servo control.

* * * * *